Н2,941,002

β-HYDROXY CARBOXYLIC ACID AMIDES SUBSTITUTED AT THE NITROGEN ATOM

Gustav Ehrhart, Bad Soden (Taunus), Ingeborg Hennig, Kelkheim (Taunus), Ernst Lindner, Frankfurt am Main, and Heinrich Ott, Eppstein (Taunus), Germany, assignors to Farbwerke Hoechst Aktiengesellschaft vormals Meister Lucius & Brüning, Frankfurt am Main, Germany, a corporation of Germany No Drawing. Filed Oct. 29, 1957, Ser. No. 693,015

Claims priority, application Germany Nov. 6, 1956

5 Claims. (Cl. 260—562)

The unsubstituted β-hydroxy-butyric acid amide is described in Helv. Chim. Acta 8 (1925), page 393. Furthermore, N-disubstituted amides of branched β-hydroxycarboxylic acids are known as insect repellents from J. Am. Chem. Soc. 70 (1948), page 677, and 75, page 2416 (1953).

The present invention relates to carboxylic acid amides substituted at the nitrogen atom and β-carbon atom of the general formula

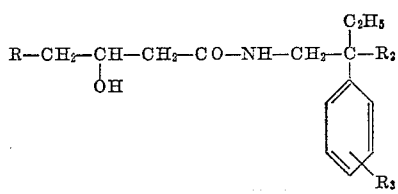

wherein R represents hydrogen, methyl or ethyl, $R_2$ an alkyl radical containing at most 4 carbon atoms and $R_3$ hydrogen, alkyl or alkoxy radicals containing at most 4 carbon atoms.

Now it has been found that the compounds of the above formula are valuable narcotics which can be obtained in a good yield according to processes generally used for the preparation of such carboxylic acid amides.

The reaction of β-hydroxy-carboxylic acids or their functional derivatives with the amines corresponding to the above formula, whereby the desired carboxylic acid amides can for example be obtained, is carried out according to known methods. As β-hydroxy-carboxylic acids are mentioned for example: β-hydroxy-butyric acid, β-hydroxy-valeric acid, β-hydroxy-caproic acid. According to the process of the present invention there are used with special advantage the low alkyl or phenyl esters of these acids which are reacted with the corresponding amines. This reaction is effected in the usual manner by prolonged heating of both components, if necessary in the autoclave. As amines may be used for example: 2-methyl-2-phenyl-n-butyl-(1)-amine, 2-ethyl-2-phenyl-n-butyl-(1)-amine, 2-n-propyl-2-phenyl-n-butyl-(1)-amine, 2 - isopropyl - 2 - phenyl-n-butyl-(1)-amine, 2-n-butyl-2-phenyl-n-butyl - (1) - amine, 2-isobutyl-2-phenyl-n-butyl-(1)-amine, 2-sec.butyl-2-phenyl-n-butyl-(1)-amine, 2-tert.butyl-2-phenyl-n-butyl-(1)-amine. Instead of the amines not substituted in the phenyl nucleus there may also be used amines substituted by low molecular alkyl radicals such as methyl, ethyl, propyl, and butyl radicals, or by low molecular alkoxy radicals such as methoxy, ethoxy, propoxy and butoxy radicals. An advantageous process starting from functional derivatives of the β-hydroxycarboxylic acids, is carried out by reacting β-hydroxycarboxylic acid halides, preferably the corresponding acid chlorides or acid bromides of the β-hydroxy-carboxylic acids, whose hydroxyl group is suitably substituted by an acyl radical, with the above-mentioned amines. For the preparation of β-hydroxy-carboxylic acid amides with a free hydroxyl group, the latter can be protected by a radical that is easily split off. Upon termination of the reaction, this protective group is split off in the usual manner. For example by hydrolyzation with dilute alkalies or acids. This reaction is suitably carried out in an inert solvent, for example ether, benzene, toluene, methylene chloride or chloroform, in the presence of an agent splitting off hydrogen halide and, generally, it is already successful in the cold. It is of particular advantage to use as agent splitting off hydrogen halide a second mol of the amine used for the reaction. The hydrogen halide of the amine that has separated can directly be filtered off with suction or be removed by shaking with water.

When preparing the products of the present invention it is of particular advantage to use the reduction of the β-keto-carboxylic acid amides. As such amides there may for example be mentioned: acetoacetic acid amides, β-keto-valeric acid amides and β-keto-caproic acid amides. By amides there are meant such compounds as contain the above-mentioned amines as amide components in the acid amide group.

The preparation of the β-keto-carboxylic acid alkyl amides can, for example, be carried out in the following manner. Acetoacetic acid alkyl amides that are easily accessible from diketen and from the aforementioned amines are reacted with an unbranched aliphatic carboxylic acid halide containing 3–4 carbon atoms in the presence of an agent splitting off hydrogen halide. The α-acetyl group can be eliminated by means of dilute acids or alkali hydroxide solutions, preferably by methanol and dilute hydrochloric acid, from the diketo compounds formed, whereby β-keto-carboxylic acid alkyl amides with at least 5 to 6 carbon atoms in the carboxylic acid radical are obtained. The reaction takes place according to the following scheme:

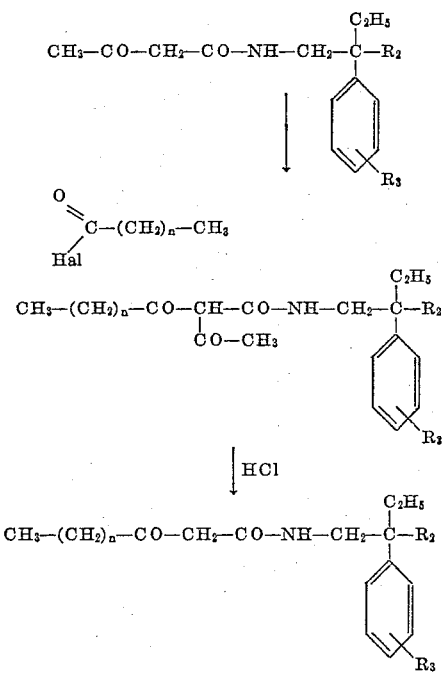

wherein $R_2$ and $R_3$ have the significance indicated above and $n$ stands for 1 or 2.

Of the aliphatic acid halides suitable for the reaction there may, for example, be mentioned: propionyl chloride and butyryl chloride. As agents splitting off hydrogen halide there are suitable alkali metal and alkaline earth metal oxides or hydroxides, carbonates and bicarbonates. Calcium oxide is preferably used. The reaction may also be carried out in the presence of organic bases. The operation is suitably carried out in inert organic solvents in which the inorganic agents splitting off hydrogen halide are suspended. As such solvents there are particularly concerned for example: methylene chloride, ethylene chloride, chloroform, benzene and toluene. The aliphatic acid chloride is added dropwise, while stirring, to the suspension. In most cases the reaction takes an exothermic course. Upon termination of the reaction, the reaction mixture is made weakly acid, the inorganic salt is filtered off with suction and the reaction product is obtained by concentration of the filtrate or it is filtered off with suction in the form of its alkali metal salt together with the inorganic salts without previous acidification and is isolated from this mixture by appropriate measures (for example acidification and extraction with an organic solvent). The acetyl group is easily split off, for example by heating for about 30 minutes with a mixture of dilute hydrochloric acid and a low molecular alcohol, preferably methanol. The isolation is effected by dilution and subsequent extraction with a suitable solvent. From the latter the β-keto-carboxylic acid amides can be isolated in the usual manner, for example by distillation under reduced pressure. The β-keto-carboxylic acid alkyl amides obtained according to this process in a good yield can then be reduced in known manner to form the β-hydroxy-carboxylic acid alkyl amides. The reduction of the keto group can, for example, be effected catalytically with the aid of metals of the 8th group of the periodic system, preferably nickel catalysts, in the presence of the customary solvents such as aqueous alcohols, alcohols or water. Noble metals or Raney catalysts may also be used. It is also possible to reduce by means of nascent hydrogen, for example with aluminum amalgam and alcohol, sodium amalgam, lithium aluminum hydride or sodium boron hydride. The reaction may also be carried out electrolytically.

Furthermore, β-hydroxy-carboxylic acid amides can be prepared according to the invention from the β-amino-carboxylic acid amides which are obtained according to the usual methods. To these β-amino-carboxylic acid amides with the desired substituent at the amide nitrogen atom is added dropwise, while stirring and, if necessary, while cooling, in the presence of a dilute mineral acid, preferably hydrochloric or sulfuric acid, the equimolar quantity of a concentrated aqueous solution of an alkali metal nitrite, preferably sodium nitrite. The evolution of nitrogen indicating the transformation of the amino group into the hydroxy group generally commences when heating to room temperature. The reaction mixture is stirred for some time at room temperature, if necessary at moderately elevated temperatures (for example in the steam bath) until the evolution of gas has ceased and thus the transformation of the amino group into the hydroxy group is complete.

As starting compound there is likewise suitable the β-butyrolactone that can be prepared according to known processes, for example by catalytic hydrogenation of diketen. By reaction with the said monoalkylamines the said β-hydroxy-butyric acid amides are directly obtained. This reaction takes place by the action of the two components in the presence or absence of solvents, for example water or organic solvents such as alcohols, benzene, toluene or ethers. Usually, the reaction sets in spontaneously and the reaction products can be isolated from the reaction mixture by fractional distillation or by crystallization.

The products of the present invention are valuable medicaments and have favourable therapeutic properties, while showing a very low toxicity. According to the quantity of the administered dose they may be used as very good sedatives, hypnotics and narcotics.

In order to test the products of the present invention for their narcotic action, mice were given an intravenous injection of 50 mg./kg. of the products in the form of a 10% solution in propylene glycol of 100% strength. When using β-hydroxy-butyric acid N-[2-ethyl-2-phenyl-n-butyl-(1)] the amide treated mice were narcotized: they remained quietly on their back. When administering the aforementioned dose the narcosis lasted for about 5 minutes. When double the quantity, that is to say 100 mg./kg., was injected the narcosis lasted for about 30 minutes. When using rats as test animals an intravenous injection of 50 mg./kg. of the said compound produced likewise a narcosis lasting for about 5 minutes during which the animals could be turned on their backs and remained there. 100 mg./kg. produced a prolonged effect also in the case of rats; the duration of the narcosis varied between 30 and 45 minutes. The same applies to the dog in which case the intravenous injection of a 20% solution in propylene glycol of 100% strength of 50 mg./kg. led to a deep and quiet narcosis setting in 1 minute after the injection. The postural reflexes had ceased while the corneal reflex could still be elicited; the animals remained on their back. Greater operations, for example a laparotomy, were also possible. The greatest depth of the narcosis lasted for about 15 to 20 minutes. One hour after the injection the dogs ran about again. Of special importance is that the dogs fall asleep and wake up without any excitation.

As further compounds having a narcotic effect there may be mentioned for example the substances contained in the following table:

| No. | Compound | Smallest dose producing a narcotic effect in the rat at an average duration of the narcosis of 20 min. and more, mg./kg. | Minimum lethal dose (i.v.), mg./kg. |
| --- | --- | --- | --- |
| 1 | β-hydroxy-caproic acid [2-phenyl-2-ethyl-n-butyl-(1)]-amide | 50 | 75 |
| 2 | β-hydroxy-butyric acid [2-p-tolyl-2-ethyl-n-butyl-(1)]-amide | 75 | 100 |
| 3 | β-hydroxy-butyric acid [2-m-methoxy-phenyl-2-ethyl-n-butyl-(1)]-amide | 40 | 80 |

Of special importance for the application of the products of the present invention as medicaments is their low toxicity. The above table indicates the minimum lethal dose for the products of the present invention after intravenous administration.

The products of the present invention may be administered per os as well as parenterally. They can be worked up to medicinal preparations, for example, to tablets or injection solutions. When preparing tablets there are added the usual carrier substances such as lactose, starch, tragacanth and magnesium stearate.

The following examples illustrate the invention but they are not intended to limit it thereto:

EXAMPLE 1

*β-Hydroxy-butyric acid-N-[2-ethyl-2-phenyl-n-butyl-(1)]-amide*

17.7 grams of 2-ethyl-2-phenyl-n-butyl-(1)-amine are dissolved in 30 cc. of benzene. To this solution there are added dropwise at −40° C. 9 grams of diketen. After having stirred for one hour the benzene is evaporated under reduced pressure. The residue solidifies upon trituration with petroleum ether. There are obtained 23 grams of acetoacetic acid-N-[2-ethyl-2-phenyl-n-butyl-(1)]-amide melting at 61° C. 14 grams of this compound are hydrogenated at room temperature in the presence of Raney nickel or a nickel catalyst deposited on kieselguhr and in the presence of methanol as solvent. After the calculated quantity of hydrogen has been taken up the catalyst is filtered off and the filtrate is freed from the solvent. By distillation under reduced pressure there is obtained in a practically quantitative yield the β-hydroxy-butyric acid-N-[2-ethyl-2-phenyl-n-butyl-(1)]-amide boiling at 180–182° C. under a pressure of 0.9 mm. Hg. The melting point amounts to 66–67° C. (after recrystallization from diisopropyl ether).

EXAMPLE 2

*β-Hydroxy-butyric acid-[2-(p-tolyl)-2-ethyl-n-butyl-(1)]-amide*

32 grams of 2-(p-tolyl)-2-ethyl-n-butyl-(1)-amine are reacted with diketen as described in Example 1. The 46 grams of the acetoacetic acid derivative obtained are hydrogenated by means of Raney nickel in the manner as is also described in Example 1. There are obtained 38.6 grams of β-hydroxy-butyric acid-[2-(p-tolyl)-2-ethyl-n-butyl-(1)]-amide boiling at 194–196° C. under a pressure of 0.7 mm. Hg.

EXAMPLE 3

*β-Hydroxy-caproic acid-[2-phenyl-2-ethyl-n-butyl-(1)]-amide*

34 grams of acetoacetic acid-[2-ethyl-2-phenyl-n-butyl-(1)] are dissolved in 150 cc. of methylene chloride and to this solution are added dropwise in the presence of 20 grams of calcium oxide 14 grams of butyryl chloride. The reaction is exothermic and is conducted in such a way that the methylene chloride keeps boiling during the drop-wise addition. On addition of 2 N-hydrochloric acid the two layers that have formed are separated and the aqueous layer is repeatedly shaken out with methylene chloride.

After washing the methylene chloride solution with a sodium bicarbonate solution the methylene chloride solution is dried and the solvent is distilled off. 41 grams of α-acetyl-β-keto-caproic acid-2-phenyl-2-ethyl-n-butyl-(1)-amide are obtained in the form of a thick oil which as crude product is boiled for about 30 minutes under reflux with 100 cc. of methanol and 10 cc. of 1 N-hydrochloric acid. After dilution with water and neutralization with sodium carbonate the solution is extracted with ether. The residue (30 grams) obtained on evaporation of the ether in the form of a thick oil is hydrogenated at room temperature in the presence of Raney nickel or a nickel catalyst deposited on kieselguhr and in the presence of methanol as solvent. Upon absorption of the calculated quantity of hydrogen the catalyst is filtered off and the filtrate is freed from the solvent. By distillation under reduced pressure there are obtained 20 grams of β-hydroxy-caproic acid-[2-phenyl-2-ethyl-n-butyl-(1)]-amide boiling at 170–175° C. under a pressure of about 0.2 mm. Hg.

EXAMPLE 4

*β-Hydroxy-butyric acid-N-[2-ethyl-2-phenyl-n-butyl-(1)]-amide*

To a solution of 17 grams of β-acetoxy-butyric acid chloride in 50 cc. of ether is added dropwise, while stirring, a solution of 36 grams of 2-phenyl-2-ethyl-butyl-(1)-amine in 30 cc. of ether. When the precipitation of the corresponding amine hydrochloride sets in, the reaction mixture solidifies and is diluted with altogether 250 cc. of ether. 100 cc. of water are added to the thick white magma, the clear layers that have formed are separated and the ethereal solution is washed once with water. After drying and distilling off the ether the sirupy residue of the β-acetoxy-butyric acid-N-[2-ethyl-2-phenyl-n-butyl-(1)] is distilled, (boiling point 158–160° C. under a pressure of 0.2 mm. Hg.).

5 grams of the viscous oil obtained are heated for one hour on the steam bath with 25 cc. of a sodium hydroxide solution and 25 cc. of alcohol. After cooling and dilution with water the whole is extracted with ether. The residue crystallizes and there is obtained the β-hydroxy-butyric acid-N-[2-ethyl-2-phenyl-n-butyl-(1)]-amide melting at 66–67° C. (after recrystallization from diisopropyl ether).

EXAMPLE 5

*β-Hydroxy-butyric acid-[2-methyl-2-phenyl-butyl-(1)]-amide*

56.5 grams of 2-methyl-2-phenyl-butyl-(1)-amine in 150 cc. of benzene are reacted at 40° C. with 29 grams of diketen. After distillation of the solvent the residue solidifies. On recrystallization from cyclohexane there are obtained 70 grams of acetoacetic acid-[2-methyl-2-phenyl-butyl-(1)]-amide melting at 69–70° C. 70 grams of this compound are dissolved in 140 cc. of methanol and 20 cc. of water and 3.5 grams of sodium boron hydride are added in portions. After the reaction has subsided the reaction mixture is concentrated. The aqueous residue is extracted with ether, the ethereal solution is washed with dilute hydrochloric acid and the ether residue is distilled. There are obtained 60 grams of β-hydroxy-butyric acid-[2-methyl-2-phenyl-butyl-(1)]-amide in the form of a viscous colourless oil boiling at 158–159° C. under a pressure of 0.15 mm. Hg.

75 grams of acetoacetic acid-[2-butyl-2-phenyl-butyl-(1)]-amide obtained in the corresponding manner from diketen and the corresponding amine are transformed in analogous manner into 56 grams of β-hydroxy-butyric acid-[2-butyl-2-phenyl-butyl-(1)]-amide boiling at 166–168° C. under a pressure of 0.12 mm. Hg.

EXAMPLE 6

*β-Hydroxy-butyric acid-[2-ethyl-2-phenyl-butyl-(1)]-amide*

30 grams of β-hydroxy-butyric acid methyl ester and 50 grams of 2-phenyl-2-ethyl-butyl-(1)-amine are boiled under reflux for 10 hours in the oil bath of 160° C. After distillation there are obtained 48 grams of β-hydroxy-butyric acid-[2-ethyl-2-phenyl-butyl-(1)]-amide melting at 66–67° C. (boiling point 155° C. under a pressure of 0.2 mm. Hg.).

EXAMPLE 7

*β-Hydroxy-butyric acid-[2-ethyl-2-phenyl-butyl-(1)]-amide*

9 grams of β-butyrolactone in 30 cc. of ether are added, while cooling, to 18 grams of 2-ethyl-2-phenyl-butyl(1)-amine in 30 cc. of ether. After standing for 5 hours the unreacted reagents are distilled off. The residue is distilled under reduced pressure. 12 grams of β-hydroxy-butyric acid-[2-ethyl-2-phenyl-butyl-(1)]-amide melting at 66–67° C. are obtained (boiling point 156° C. under a pressure of 0.2 mm. Hg).

EXAMPLE 8

*β-Hydroxy-butyric acid-[2-ethyl-2-phenyl-butyl-(1)]-amide*

1.5 grams of sodium boron hydride are added in portions to a solution of 26 grams of acetoacetic acid-[2-ethyl-2-phenyl-butyl-(1)]-amide in 100 cc. of methanol and 20 cc. of water. After concentration the solution is extracted with ether and the ethereal solution is washed with dilute hydrochloric acid. From the ether residue there are obtained 23 grams of β-hydroxy-butyric acid-[2-ethyl-2-phenyl-butyl-(1)]-amide melting at 66° C.

EXAMPLE 9

*β-Hydroxy-butyric acid-[2-ethyl-2-(m-methoxy-phenyl)-butyl-(1)]-amide*

40 grams of 2-ethyl-(2-m-methoxy-phenyl)-butyl-(1)-amine in 80 cc. of benzene are reacted at 35–40° C. with 17.5 grams of diketen. After distillation of the benzene there are obtained 58.5 grams of the acetoacetic acid-[2-ethyl-(2-m-methoxy-phenyl)-butyl-(1)]-amide.

58.5 grams of this compound are dissolved in 130 cc. of methanol and 60 cc. of water and 2.3 grams of sodium boron hydride are added in portions. After the exothermic reaction has subsided, the methanol is distilled off, the residue is taken up in ether and washed with water. After drying and distilling off the solvent there remain 54 grams of β-hydroxy-butyric acid-[2-ethyl-2-(m-methoxy-phenyl)-butyl-(1)]-amide in the form of a yellow oil.

EXAMPLE 10

β - Hydroxy - butyric acid-[2-ethyl-2-(p-ethoxy-phenyl)-butyl-(1)]-amide 52.5 grams of 2-ethyl-2-(p-ethoxy-phenyl)-butyl-(1)-amine in 125 cc. of benzene are reacted with 22 grams of diketen. The 72 grams of acetoacetic acid-[2-ethyl-2-(p-ethoxy-phenyl)-butyl-(1)]-amide obtained are reduced as described in Example 9 with 1.2 grams of sodium boron hydride to form the β-hydroxy-butyric acid-[2-ethyl-2-(p-ethoxy-phenyl)-butyl-(1)]-amide. There are obtained 18.3 grams of the product in the form of a yellow oil.

EXAMPLE 11

β-Hydroxy-butyric acid-[2-ethyl-2-phenyl-butyl-(1)]-amide 15 grams of β-amino-butyric acid-[2-ethyl-2-phenyl-butyl-(1)]-amide prepared from acetoacetic acid-[2-ethyl-2-phenyl-butyl-(1)]-amide by catalytic hydrogenation in methanol saturated with ammonia and in the presence of Raney nickel are dissolved in 100 cc. of 2 N-hydrochloric acid and heated on the steam bath. To the reaction solution is added dropwise, while stirring and heating on the steam bath, a concentrated aqueous solution of 4 grams of sodium nitrite. The evolution of nitrogen setting in at once is terminated by stirring for one hour while heating on the steam bath. The oil that has separated is extracted with ether and the ether residue is distilled under reduced pressure. There are obtained 8 grams of β-hydroxy-butyric acid-[2-ethyl-2-phenyl-butyl-(1)]-amide boiling at 155° under a pressure of 0.2 mm. Hg.

We claim:

1. Substituted β-hydroxy carboxylic acid amides of the general formula

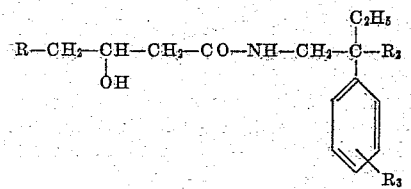

wherein R is a member selected from the group consisting of hydrogen, methyl and ethyl, $R_2$ represents an alkyl radical containing at most 4 carbon atoms and $R_3$ is a member selected from the group consisting of hydrogen, alkyl and alkoxy radicals containing at most 4 carbon atoms.

2. β-Hydroxy - butyric acid-N-[2-ethyl-2 - phenyl-n-butyl-(1)]-amide.

3. β - Hydroxy - butyric acid - [2-(p-tolyl)-2-ethyl-n-butyl-(1)]-amide.

4. β - Hydroxy-caproic acid-[2-phenyl-2-ethyl-n-butyl-(1)]-amide.

5. β - Hydroxy-butyric acid-[2-ethyl-2 - (m-methoxy-phenyl)-butyl-(1)]-amide.

References Cited in the file of this patent

FOREIGN PATENTS

F. 16,886     Germany _____ Nov. 29, 1956